United States Patent

Wiggs et al.

[11] Patent Number: 5,816,314
[45] Date of Patent: *Oct. 6, 1998

[54] GEOTHERMAL HEAT EXCHANGE UNIT

[76] Inventors: B. Ryland Wiggs, 425 Sims La., Franklin, Tenn. 37069; Jack L. Womack, 115 Autumn La., Tullahoma, Tenn. 37388; William C. Bickford, 1522 Stonewall Blvd., Murfreesboro, Tenn. 37130; John E. Hawk, 1000 Old Jefferson Pike, Smyrna, Tenn. 37167

[ * ] Notice: The term of this patent shall not extend beyond the expiration date of Pat. No. 5,623,986.

[21] Appl. No.: 593,361

[22] Filed: Jan. 29, 1996

Related U.S. Application Data

[63] Continuation-in-part of Ser. No. 530,053, Sep. 19, 1995, Pat. No. 5,623,986.

[51] Int. Cl.[6] .................................................... F28D 21/00
[52] U.S. Cl. ......................... 165/45; 165/134.1; 62/260
[58] Field of Search .................................. 165/45, 134.1, 165/163; 62/260

[56] References Cited

U.S. PATENT DOCUMENTS

| | | | |
|---|---|---|---|
| 3,183,675 | 5/1965 | Schroeder | 165/45 X |
| 3,274,769 | 9/1966 | Reynolds | 165/45 X |
| 3,871,444 | 3/1975 | Houser et al. | 165/163 X |
| 4,010,801 | 3/1977 | Terry | 165/45 X |
| 4,741,388 | 5/1988 | Kuroiwa | 165/45 |
| 5,025,634 | 6/1991 | Dressler . | |
| 5,224,357 | 7/1993 | Galiyano et al. | 62/260 |
| 5,272,879 | 12/1993 | Wiggs | 165/45 X |
| 5,461,876 | 10/1995 | Dressler . | |
| 5,561,985 | 10/1996 | Cochran | 62/260 |
| 5,623,986 | 4/1997 | Wiggs | 165/45 |

FOREIGN PATENT DOCUMENTS 3514191  10/1986  Germany .

*Primary Examiner*—Leonard R. Leo
*Attorney, Agent, or Firm*—Waddey & Patteron; Mark J. Patterson

[57] ABSTRACT

An improved geothermal heat exchange unit, which can be placed in ground and/or water, has a rigid hollow core about which is formed a helical winding of thermally conductive tube. The return section of the tube extends vertically along a central axis of the core, separated from the inner wall of the core by thermal insulating material. The heat exchange unit is optionally encased in a solid thermally conductive casing and may have a small diameter oil return tube from the lowermost portion of the unit to the suction intake port of a gas compressor. An optional high pressure water hose is attached for installation assistance in wet sand or wet soils.

9 Claims, 5 Drawing Sheets

GEOTHERMAL HEAT EXCHANGE UNIT

This is a continuation-in-part of U.S. patent application Ser. No. 08/530,053, filed Sep. 19, 1995 for an "Advanced In-Ground/In-Water Heat Exchange Unit," now U.S. Pat. No. 5,623,986.

BACKGROUND OF THE INVENTION

The present invention relates heating/cooling systems and/or power generation systems which utilize an in-ground and/or in-water heat exchanger as a primary or supplemental source of heat transfer, as well as to methods of installing an in-ground heat exchange tube.

Ground source/water source heat exchange heating and cooling systems typically utilize closed loops of tubing buried in the ground or placed in a body of water, such as a lake. These closed loops may be installed in a variety of configurations, including horizontally, in helical loops, and in vertical orientations typically consisting of elongated U-shaped tubes placed into holes drilled into the earth. These heat exchange loops will carry a water/anti-freeze mixture in a water source heat exchange system, or a refrigerant in a direct expansion system.

While most ground source heat exchange designs work relatively well, there are four common disadvantages associated with prior art systems. First, extensive excavation or expensive well drilling is necessary to install them. Second, good soil compaction around the heat exchange loop is essential but difficult to attain. Third, many prior art systems lose efficiency because of a "short-circuiting" of the heat transfer achieved in the ground, due to the use of proximately located supply and return lines. A fourth drawback is that prior art systems have a relatively small soil/water contact surface area.

Various prior art in-ground heat exchange techniques address some, but not all, of the deficiencies, as more fully discussed and addressed in Wiggs' co-pending U.S. patent application Ser. No. 08/530,053, filed Sep. 19, 1995 for an "Advanced In-Ground/In-Water Heat Exchange Unit."

The '053 Wiggs application teaches that the problems of prior art systems can be mitigated by winding a thermally conductive supply tube around a hollow sleeve, with the return tube being thermally insulated and returning up the center of the hollow sleeve. The '053 Wiggs application further explains that the improved heat exchange unit as described can be placed within a thermally conductive encasement whenever it is desirable to increase the conductive surface area or to provide a hard protective shell.

Another problem that occurs in prior art geothermal heat exchangers used in areas where highly acidic or basic soil reactive conditions exist is corrosion of the metal tubing. When utilized in a direct expansion application, the refrigerant fluid transfer tubes entering and exiting any heat exchange unit are likely to consist of copper or other metal. These entering and exiting metal tubes, which convey the refrigerant fluid to and from the exterior, subterranean heat exchange units, when located in reactive acidic or basic soils, must be protected, so as to prevent exposure to the acidic or basic reactive soil conditions. Alternatively, these subterranean exposed metal refrigerant fluid transfer tubes must be cathodically protected via the maintenance of a slight electrical current or via a sacrificial anode.

Cathodic protection of exposed copper tubes, via a sacrificial anode, is taught for utilization with a modular tube bundle application, or with an application of a plurality of tubes disposed in a substantially planar array along inclined walls of a trench, in U.S. Pat. No. 5,224,357, as assigned to United States Power Corporation. However, the utilization of cathodic protection is not disclosed for use in other geothermal heating/cooling applications, is not taught in a manner so as to prevent adverse galvanic cell reactions, and is not disclosed in an operative manner. Cathodic protection is also not disclosed in a manner so as to help insure operational design via location in ground with as similar as possible moisture content as the exposed metal fluid transfer tubes to be protected. Additionally, cathodic protection of the exposed subterranean metal tubes, via the maintenance of a slight electrical current, is neither taught nor claimed.

The plastic coating of metal tubing, buried in the ground for use as heat exchange tubes, is taught in DE 3514191A1 to Waterkotte, and has reportedly been utilized in Europe for many years. The plastic coating is a thin coating, so as to prevent excessive inhibition of necessary heat transfer. However, a heavy encasement of the line sets, leading to and from the subterranean heat-transfer tubes, in a non-reactive material, such as a PVC pipe, is neither utilized nor taught. The line sets can be encased within a non-reactive, and poor heat conductive, PVC pipe since heat transfer is not typically designed to be primarily achieved through the line sets leading to and from the subterranean heat exchange tubes and/or units. Further, a thin plastic coating of exposed metal tubing utilized in a geothermal heating/cooling application in a reactive soil is dangerous, since only a pinhole sized scrape of the thin plastic coating anywhere along the underground tube would result in an exposed area of the metal tubing and eventual tube degradation and refrigerant fluid leakage.

A recently issued U.S. Patent to Dressler (U.S. Pat. No. 5,461,876) shows a spiral configuration for a subterranean direct expansion heat exchange tube. However, in Dressler, the spiraled tube shown is not wrapped around a rigid central pipe, which allows the spiraled tube to maintain its spacing and shape when backfilled; the return tube is not a fully insulated return tube, which is necessary to protect against the opposite adverse thermal affect of the entering portion of the tube; the entering single tube is not distributed into multiple tubes in the downward spiral, allowing for more surface area contact where heat transfer is most critical and/or allowing for slower/faster fluid volume flow as may be desired in the critical and most intense heat transfer area; and the distributed, spiraled tubes are not provided with a heat conductive solid encasement for protection and/or for even heat dispersion and/or for increased surface area contact.

Although a spiral loop is claimed by Dressler, such a configuration is not new. For example, U.S. Pat. No. 4,741,388 to Kuroiwa, is virtually identical to Dressler's claim for a direct expansion system, but better, since Kuroiwa insulates some portion of the fluid return tube, via an enveloping insulation.

However, Kuroiwa's design is subject to the same other problems as Dressler's design, such as: failure to wrap the spiraled tube around a rigid central core; failure to fully insulate the return tube (in a direct expansion system, due to the extreme temperature differentials in the entering and exiting refrigerant fluid, the "entire" return tube must be insulated to achieve maximum efficiency—not merely a portion of the return tube as shown by Kuroiwa); failure to distribute the entering single tube into multiple tubes to provide more surface area contact and to provide for desired slower/faster fluid volume flow; and the distributed, spiraled tubes are not provided with a heat conductive solid encasement. Kuroiwa does teach his spiral loop may be inserted into a bore hole, which hole may have an encasement. However, the encasement taught by Kuroiwa is a hollow pipe with holes in the shell so as to allow ground water in and out for thermal contact with the spiraled heat transfer tubes lowered into the hollow perforated encasement pipe. The problem with Kuroiwa's design is that whenever there is insufficient ground water to totally fill the perforated, hollow pipe encasement, there will be an air gap between the spiraled heat transfer tube and the perforated, hollow pipe, which is in thermal contact with the ground. Consequently, wherever there is an air gap, the desired efficiency of the heat transfer tube will be greatly diminished. This problem is overcome via the present invention's teaching of a solid, heat conductive encasement.

Further, while Dressler, in his '876 patent, utilizes a pair of concentric tubes separated by an insulating sleeve to prevent thermal migration between the adjoining tubes in a direct expansion system, Dressler also teaches if the insulating sleeve must be protected from the refrigerant, it may be encapsulated in a surrounding tube, or the insulating sleeve may comprise a vacuum which thermally isolates the space between the tubes. Thus, Dressler teaches, in a direct expansion system, that the space between two adjoining tubes may be insulated. However, merely insulating the space directly between two adjoining tubes in a geothermal installation is of little value. This is because, in a geothermal system, the return fluid line, in its entirety, must be totally encapsulated in insulation itself, whether via surrounded by rubatex and/or a PVC tube and/or vacuum or the like, so as to prevent adverse heat migration via the surrounding soil or grout or other heat conductive material. In a direct expansion system, this heat may typically migrate so as to heat saturate or heat deplete an area within at least an approximate six inch diameter surrounding the direct expansion heat transfer tube.

Lastly, it may be preferable, when connecting units in a vertical series, to provide a means for rigidly connecting one unit to the other, such as collar connections for the interior and/or exterior tubing and/or non-thermally conductive tubing and/or outer shell, and/or such as outer shell fasteners.

SUMMARY OF THE INVENTION

In accordance with the present invention, a conventional U-shaped geothermal heat exchange tube, within which a heat exchange fluid is circulated, is provided with an insulated fluid return line, which insulates all or some portion of the fluid return portion of the U-shaped tube, so as to prevent short-circuiting and loss of the geothermal heat gain/loss advantage to the thermally disadvantageous incoming portion of the U-shaped tube. Further, the hole into which the U-shaped tube is inserted is filled with a fill which preferably cures and hardens into a solid, so as to eliminate disadvantageous air gaps and increase thermal conductivity.

The Wiggs advanced in-ground/in-water heat exchange unit is improved, for use in a direct expansion application, by a small diameter tube, running from the suction intake port to the gas compressor through the central insulated core of the unit, to the lowermost portion of the conductive tubing through which the refrigerant is circulated, so as to return any pooled compressor lubricant oil to the compressor and/or by means of utilizing a conventional oil separator (not shown) in conjunction with the compressor when a Wiggs advanced in-ground/in-water heat exchanger unit is utilized for in-ground/in-water heat transfer. While the use of oil separators in refrigeration systems are known, the use of an oil separator in conjunction with a Wiggs advanced in-ground/in-water heat exchange unit is a unique and previously unknown application. In regards to the utilization of a small diameter oil return tube, while such tubes are known, the use of such a tube with a Wiggs advanced in-ground/in-water heat exchange unit is a unique and previously unknown application, as is the extension of the oil return tube to the lowermost section of the in-ground/in-water heat exchange tubes, since prior art generally demonstrates the oil return tube extends to the gas compressor intake out from the bottom of an accumulator (see Dressler, U.S. Pat. No. 5,025,634) and/or from the bottom of other above-ground components. Further, any direct expansion system utilizing underground heat exchangers of any design, including the Wiggs' unit, can be significantly improved by utilizing a compressor designed for use without oil, which compressor solely utilizes the refrigerant fluid to lubricate its moving parts, or which compressor is constructed with super sealed pistons or drive shafts, which prevent the refrigerant and oil from ever mixing, or which compressor utilizes an oil free linear, electromagnetic, motor free piston system.

The improved advanced in-ground/in-water heat exchange unit is provided with alternate means to transfer heat to/from the circulating heat exchange fluid by means of either distributing the heat exchange fluid into multiple heat conductive tubes, which may be finned or rifled for increased heat conductivity, surrounding the thermally conductive rigid casing, or by means of circulating the heat exchange fluid within the total area between the exterior of an insulated central core shell and the interior shell of a highly heat conductive tubing totally surrounding the insulated central core. In the later method, where the heat exchange fluid is circulated in the area between a non-conductive tube within a second, larger diameter heat conductive tube, the area in between the two tubes has a downward spiraled insert so as to insure the heat exchange fluid comes into contact with the entire heat conductive tube interior surface area on its path to the unit's insulated fluid return tube, which returns the heated or cooled fluid back up through the insulated center core of the unit.

The improved advanced in-ground/in-water heat exchange unit is optionally equipped with a permanent, or a temporary detachable, high pressure water hose extending from the surface to the unit's lowermost centerpoint, which high pressure water hose can be activated from a water pressure attachment at the ground surface so as to easily permit the unit's installation in wet sand or wet, loose soil. In such a wet soil or wet sand installation, a horizontal collar may be attached at the unit's top perimeter to prevent further sinking beyond the desired installation depth.

The improved advanced in-ground/in-water heat exchange unit may be installed in solid rock or firm earth by excavating a hole with a diameter larger than that of the unit, dropping the unit in place, and filling the gap between the unit and the surrounding rock or earth with a heat conductive fill that preferably cures into a solid.

Consequently, it is an object of this invention to improve the efficiency of a conventional U-shaped tube geothermal heat exchanger via insulating a portion of the return flow line, and by filing the hole containing the U-shaped tube with a highly heat conductive fill that preferably cures into a solid, so as to eliminate air gaps in the hole, and so as to increase the surface area of the uninsulated U-shaped tube by means of a heat conductive solid so as to enhance the desired heat exchange with the ground.

It is a further object of this invention, when utilizing the Wiggs heat exchange unit, to provide for a means of compressor lubricant oil return in a direct expansion application; to provide alternative means for heat exchange within the thermally conductive casing surrounding the thermally conductive tubing; to provide means for easily and efficiently installing the Wiggs' heat exchange units in wet sand and/or wet soil; and to provide a highly heat conductive means for installing the Wiggs' heat exchange unit in ground holes with diameters larger than the diameter of the unit itself, where installations are in rock or solid soils.

Accomplishment of each of these objectives will result in an increase in efficiency and/or in a decrease in system installation costs, all contributing toward enhanced returns on initial purchase and installation costs of geothermal heating/cooling systems.

BRIEF DESCRIPTION OF THE DRAWINGS

FIG. 5 also shows a method of extending the fluid supply heat transfer PVC tubing, or other similar tubing, into and out of a the unit so that all heat transfer metal, or other heat conductive tubing, which may adversely react with acidic or basic soil conditions, is totally encased within a solid protective shell, and so that all metal fluid transfer tubing, if any, may be totally inside the protective PVC tubing, leading to and from the unit.

DESCRIPTION OF THE PREFERRED EMBODIMENT

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
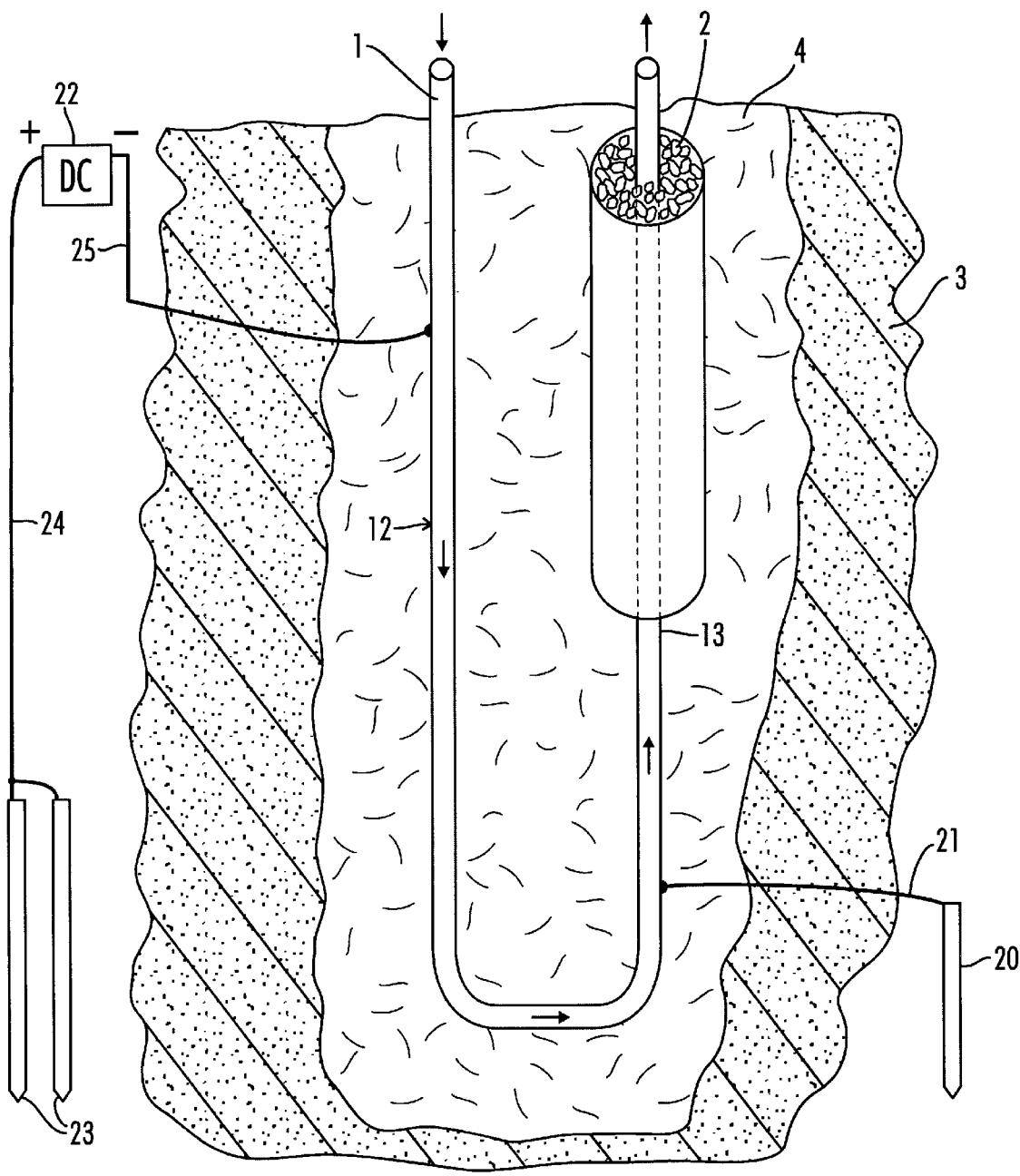
FIG. 1 is an isometric view of a first embodiment of the invention in which conventional U-shaped tubing has 50% of the fluid return line insulated and has been totally encased in a flowable fill which cures into a solid, in accordance with the present invention.

Referring now to the drawings in detail, where like numerals refer to like parts or elements, there is shown in FIG. 1 a first embodiment of the invention which utilizes a conventional elongated U-shaped, fluid transfer, ground heat exchange tube 1, as commonly utilized for vertical or slanted closed loop geothermal heating/cooling installations. The tube 1 will have a fluid supply section 12 and a fluid return section 13. Because U-shaped closed loops are commonly utilized to transfer heat to and from the ground in both water source and direct expansion (refrigerant only) geothermal heating/cooling systems, an important design improvement, easily adoptable to conventional U-shaped technology, would be to insulate all or some portion, 25% to 75% for example, of the fluid return portion of the U-shaped tube, so as to prevent thermal short-circuiting and loss of the geothermal heat gain/loss advantage to the thermally disadvantageous supply portion of the U-shaped tube. The amount of return tube to be insulated would depend on the conductivity of the heat transfer tubing utilized and on the conductivity of the specific surrounding soil. In accordance with an improvement of the invention, the heat exchange tube 1 has approximately fifty percent (50%) of the fluid return section 13 insulated by total encapsulation with an insulating material 2, which may be a foam, rubatex, or other insulating material. Alternatively, a vacuum could be pulled in a tube (not shown) which surrounds the fluid return section 13.

In a direct expansion application, where the refrigerant fluid is circulated directly into the subterranean heat exchange tube 1, instead of water, or water and anti-freeze, the entire length of the return section 13 tube should be insulated, due to the higher temperature differentials existing in the subterranean heat exchange tubes of a direct expansion system as opposed to water source subterranean heat exchange tubes.

The heat exchange tube 1 is inserted into a generally cylindrically shaped hole drilled into the ground 3, after which the hole is filled with a fill material 4 which then preferably cures into a solid, heat conductive medium, such as fly-ash cement, concrete, or the like. Preferably, the cured fill material 4 will have a higher heat conductivity rating than either the presently often utilized sand or bentonite clay backfill material.

Figure 2:
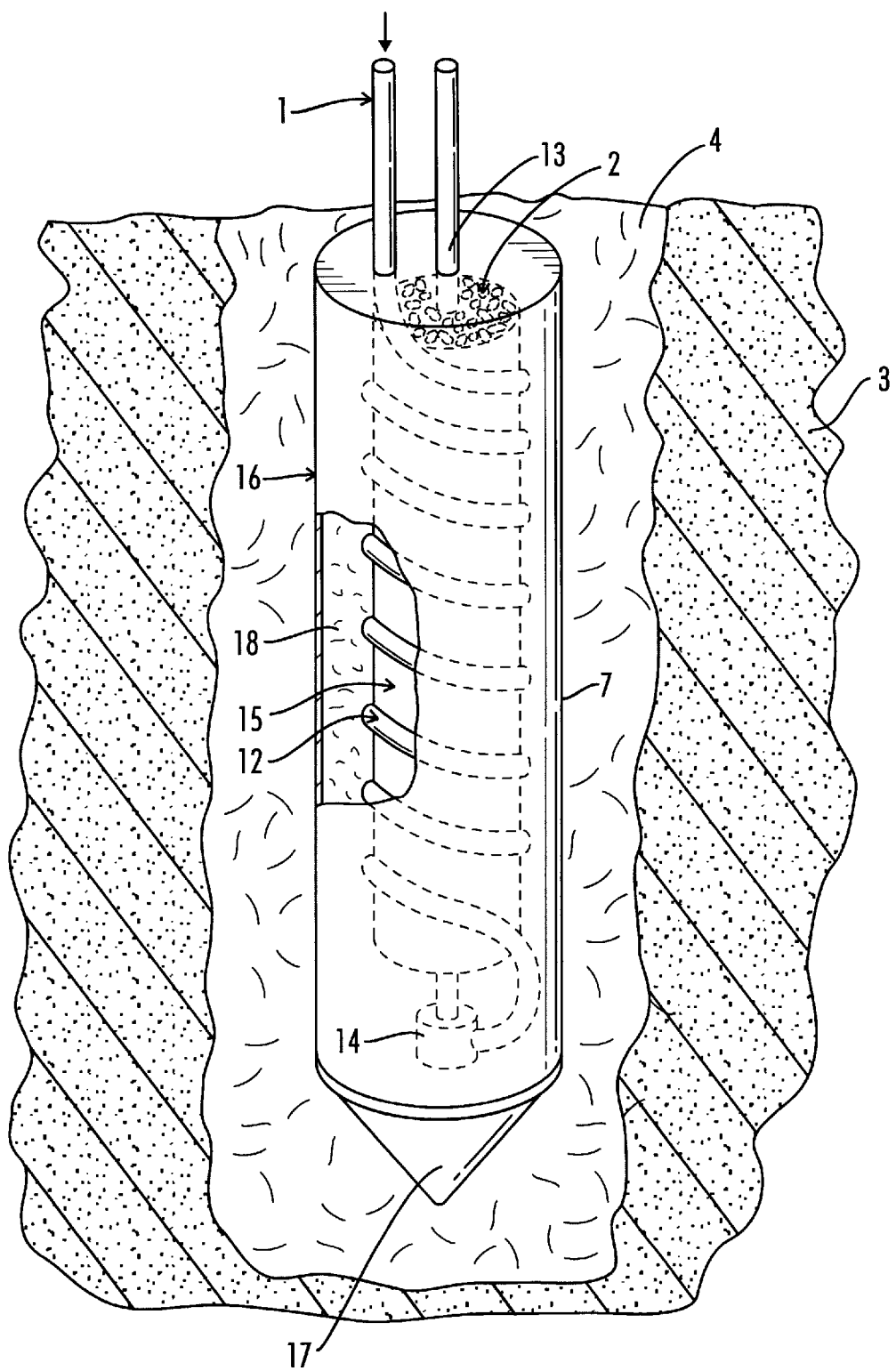
FIG. 2 is an isometric view of a second embodiment of our invention, showing the improved heat exchange unit inserted into an empty hole in the ground with a diameter larger than the unit, after which the surrounding void area is filled with a flowable fill which cures into a heat conductive solid.

FIG. 2 shows a second embodiment of the invention in which the heat exchange unit 7 is inserted into a hole dug in the ground 3. The heat exchange unit 7 has a heat exchange tube 1 with a fluid supply section 12 helically formed around a hollow, rigid cylindrical core 15. The supply section 12 terminates in a fluid tube coupling 14. The fluid return section 13 of tube 1 extends vertically upward from coupling 14 and along the central axis of core 15. The interior of core 15 is filled with a thermal insulating material 2, foam for example, to surround the return section 13 and thermally isolate it from supply section 12. The heat exchange tube 1 and related components are protected by a cylindrical outer casing 16 made of metal or other rigid and durable thermally conductive material. The lower portion of the casing 16 is shown terminating in a conical member 17. However, depending on soil conditions, the casing 16 could terminate in a flat, round, or inverted bottom form.

The space between the core 15 and casing 16 should be filled with a thermally conductive fill material 18, such as powdered metal or stone, concrete, or cement.

In solid rock or in a solid soil, where cave-ins along the bore hole for the heat exchange unit 7 are unlikely, it may be preferable to excavate the hole for unit installation at some diameter larger than the unit itself, and then, once the unit 7 has been placed into the hole, pour or insert some thermally conductive fill material 18 into the hole so as to completely fill the void area between the outer perimeter of the unit 7 and the wall of the hole bored into the solid earth or rock. Preferably, the thermally conductive fill material 18 will cure into a solid, so as to increase heat transfer effect. In FIG. 2, the void space between the exterior of the unit 7 and the surrounding ground 3 has been filled with a flowable fill material 4 which cures into a heat conductive solid, thereby providing a solid heat conductive encasement for the unit 7 and increasing the ground contact surface area to the casing 16.

Figure 3:
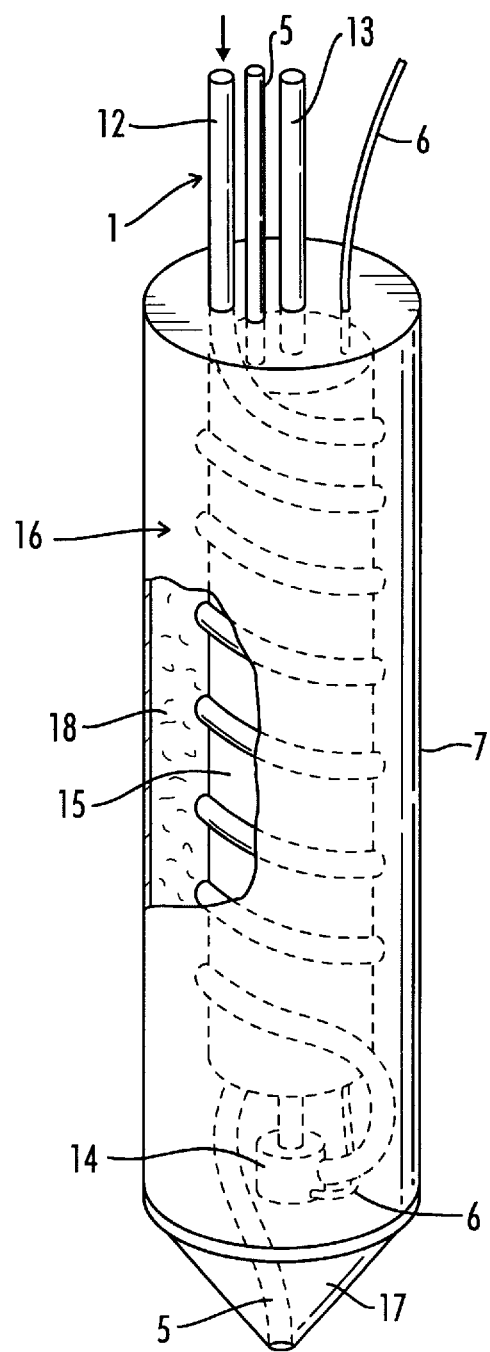
FIG. 3 is an isometric view of a third embodiment of the improved heat exchange unit of the present invention, which may be used in a direct expansion system, which has been partially cutaway and further shows in phantom certain further improvements to the embodiment of FIG. 2, including: small diameter tubing, running from the suction intake port of a gas (refrigerant) compressor (not shown) through the central insulated core of the unit to the lowermost portion of the conductive tubing through which the heat transfer fluid (refrigerant) is circulated, for a means of oil return to the gas compressor; and a high pressure water hose is inserted through the hollow, insulated, center portion of a Wiggs Advanced In-Ground/In-Water Heat Exchange Unit, extending to the lowermost center of the unit, so as to easily enable Unit installation in wet sand or wet, loose earth.

FIG. 3 shows another embodiment of the improved heat exchange unit as in FIG. 2, with the addition of a high pressure water hose 5 and a small diameter oil return tube 6. The high pressure water hose 5 travels from above the ground surface, where its input end can be connected to a conventional high pressure water pump (not shown), down through the insulated hollow cylindrical core 15 of the heat exchange unit 7. Preferably, the output end of hose 5 will extend out from the lowermost center point of conical member 17 of the casing 16. Consequently, high pressure water introduced into the hose 5 can aid in clearing a path for the unit 7 to sink through during an installation in wet sand or wet, loose earth, until it reaches the desired depth and the high pressure water flow is discontinued. Alternatively, for temporary, rather than permanent attachment, the high pressure water hose 5 could be temporarily attached to the outside of casing 16, extending to the unit bottom centerpoint. Although this temporary attachment method is not shown, a strong wire or cord could be extended downward along with the unit 7 so as to dislodge or disengage the high pressure water hose 5 temporary attachment when the desired depth is reached, thereby enabling the high pressure water hose 5 to be retracted and reused for the installation of other heat exchange units. To prevent the installed unit 7 from gradually further sinking into the wet sand or wet earth, a horizontal collar or bar (not shown) can be attached to the top of the unit 7.

FIG. 3 also shows a small diameter oil return tube 6, which travels from the above-ground heating/cooling machinery (not shown), specifically from the suction intake part of a gas (refrigerant) compressor, down through the hollow, rigid cylindrical core 15 of the heat exchange unit 7, extending to the lowermost section of the refrigerant heat transfer fluid tube 1, fluid tube coupling 14 for example. When the refrigerant or heat transfer fluid is circulated, it is usually mixed with a small amount of lubricant oil which has escaped from the compressor. In accordance with one object of the invention, tube 6 returns the escaped oil to a point near the suction intake port to the gas compressor. This allows oil accumulating at the lowermost point of the tube 1 to be returned to the compressor, along with some small and insignificant amount of refrigerant fluid. Alternative means to achieve oil return would be to utilize a conventional oil separator in conjunction with the above-ground compressor when a Wiggs heat exchange unit 7 is utilized, thus preventing oil from entering and becoming trapped in the subject heat exchange unit. A combination of the small diameter oil return tube 6 and the oil separator as described can also be used, as oil separators are not 100% efficient.

Another alternative, which would provide a significant improvement in any direct expansion system utilizing underground heat exchangers of any type, including a Wiggs heat exchange unit 7, would be to utilize a compressor in the system which does not require any lubricant oil, but instead utilizes the refrigerant fluid itself as a lubricant for all moving parts, or to utilize a compressor with super sealed pistons or drive shafts, which prevent the refrigerant and oil from ever mixing, such as those compressors manufactured by Blackmer, of 1809 Century Avenue, Grand Rapids, Mich., 49509, or to utilize an oil free linear compressor, which utilizes a linear, electromagnetic, motor free system.

As an alternative means for heat exchange within the thermally conductive fill material 18 surrounding the thermally conductive tube 1 in a Wiggs' heat exchange unit 7, it may be preferable in some applications to increase the number of thermally conductive tubes surrounding the insulated central core 15 by means of a distributor device located where the primary conductive tubing enters the unit 7, and located at a second point near or at the bottom of the unit 7 where the conductive tubing 1 begins to exit the unit through the central, insulated core. By distributing the primary heat exchange conductive tube 1, which could be finned or ridged to increase surface area and heat transfer, into two or more smaller sized conductive tubes, which could be finned or ridged, running through the thermally conductive fill material 18 of the unit 7, the surface area of the thermally conducting tube 1 is increased where needed the most, and the heat dispersion into or out of the fill 18 and casing 16 can be more evenly achieved. Further, the speed of the refrigerant flow can be increased or decreased in the subject critical heat exchange area by simply modifying the interior areas of the multiple conductive supply tubes.

Figure 4:
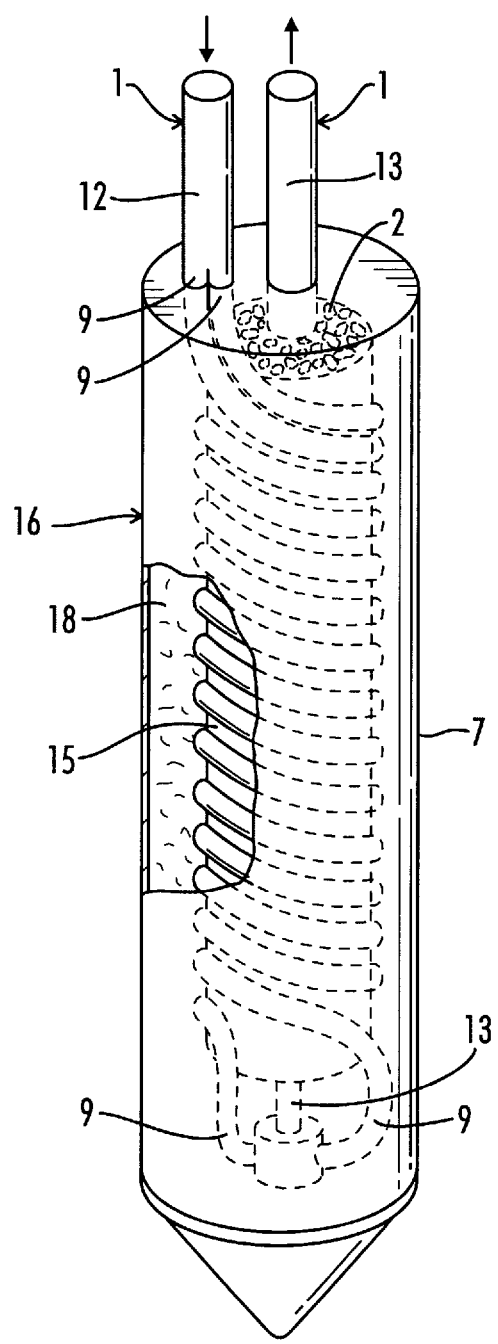
FIG. 4 is an isometric view of a fourth embodiment of the improved heat exchange unit wherein the single entering heat exchange fluid conductive tube is distributed at the top of the unit into multiple heat exchange tubes prior to rejoining and entering, at the bottom of the unit, a single insulated return fluid conductive tube.

Accordingly, FIG. 4 shows yet another embodiment of the improved heat exchange 7 wherein a single fluid supply section 12 of the fluid conductive heat exchange tube 1 has been divided, at the top of the unit 7, into two (2) smaller diameter supply tubes 9 connected in parallel to an entering portion of the supply section 12. The multiple tubes 9 are then each helically wound around the hollow rigid cylindrical core 15 to the bottom of the unit 7, where the tubes 9 are reconnected to the a single fluid return section 13 of tube 1. The combined inner cross-sectional areas of tubes 9, should equal the cross-sectional area of the primary supply/return heat exchange tube 1, unless it is desirable to decrease the flow rate of the heat transfer fluid during its path through the fill material 18, so as to increase heat transfer exposure time. In the latter case, the combined areas of the smaller tubes 9 should be larger than that of the interior area of the larger of the entering portions of supply section 12 or return section 13 of heat exchange tube 1. Conversely, if the desire is to decrease heat transfer exposure time, the combined areas of the multiple fluid heat exchange tubes 9 should be decreased, so as to increase the velocity of the fluid.

Although only two split tubes 9 are shown, more may be used. They also may be finned and/or rifled, so as to increase heat transfer surface area.

Another method of accomplishing a similar result would be to utilize a highly thermally conductive tube (such as copper) to totally surround the central insulated core, leaving adequate space between the interior wall of the highly thermally conductive tube and the exterior wall of the insulated core for the heat transfer fluid to flow. In such other method, it would be desirable to spiral loops of some material downwardly within the area where the heat transfer fluid flows so as to insure an even heat transfer fluid distribution path along the walls of the highly thermally conductive tube surrounding the exterior wall of the insulated core. If such method were to be utilized in a direct expansion system where the heat transfer fluid would consist of a refrigerant, the refrigerant fluid would have to be circulated between the walls of a double walled metal tube surrounding the hollow, rigid, cylindrical core 15 filled with insulating material 2.

Figure 5:
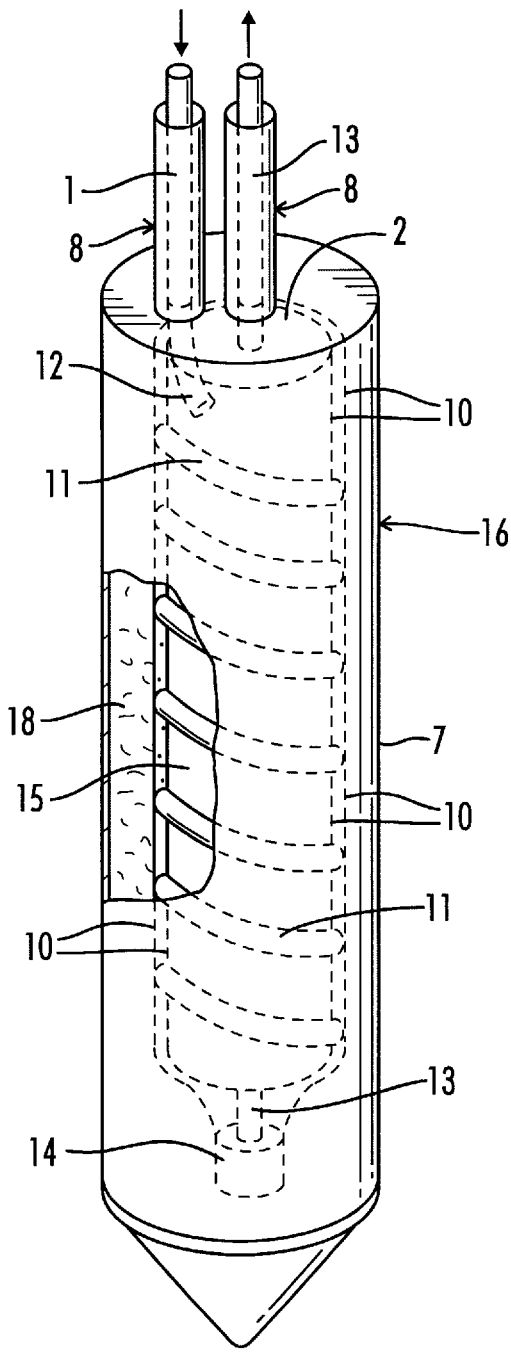
FIG. 5 is an isometric view of a fifth embodiment of the invention, showing in phantom a double walled supply section in the fluid tube wherein the heat transfer fluid is circulated between the double walls of a tube surrounding the insulated center core of unit, which interior portion of the double walled tube optionally contains downwardly spiraled inserts so as to help insure maximum and even heat transfer fluid contact with the outer, heat conductive, tube wall of the said double walled tube.

Thus, FIG. 5 shows another embodiment of the improved heat exchanger unit 7 in which the entering single heat exchange supply section 12 of tube 1 transfers the heat exchange fluid into an area created between double walls of an outer double walled tube sleeve 10 which surrounds the inner core 15 of unit 7 which is filled with insulation 2. Once the heat transfer fluid reaches the bottom of the unit 7, the fluid is transferred back into an insulated return section 13. The interior portion of the double walled tube sleeve 10 optionally contains downwardly spiraled inserts 11 so as to prevent the majority of heat transfer fluid traveling predominately down one side of the double walled tube sleeve 10, and so as to help insure maximum and even heat transfer fluid contact with the outer portion of the heat conductive double walled tube sleeve 10.

It may be preferable to connect the lowermost portion of spiraled heat exchange tube 1 in the unit 7, whether a single tube or more than one tube connected via a distributor, to a return section 13, such as a PVC tube, which has poor thermal conductivity and carries the heat transfer fluid out of the unit 7 through the center core 15. A tube coupling 14 can be used to make this connection. By using a poor thermally conductive return section 13 through the center insulated core 15 of the unit 7, unit costs can typically be reduced and the return heated or cooled fluid can be further and additionally protected from the adverse thermal effects of the supply fluid. Typically, such a poor thermally conductive fluid return section 13, which may consist of PVC or the like, would only be utilized when the fluid was water or the like.

Additionally, FIG. 5 shows a method of extending a single heat exchange fluid conductive tube 1, which may consist of PVC or other similar material which is non-reactive to acidic and/or basic soils, into the thermally conductive fill material 18 where it can transfer the heat exchange fluid into highly conductive metal tubing or other tubing materials which are protected from adverse pH level soil conditions via total encasement in the fill 18, which if used for acidic/basic protective purposes, must consist of cement or some other heat conductive flowable fill which cures into a solid, which solid is not affected by acidic or basic soil conditions. The entire fluid return section 13, in any unit 7, may consist of PVC or other similar material which has good thermal insulating qualities and which is non-reactive in either acidic or basic soils. If a refrigerant is utilized for the heat transfer fluid, the fluid return section 13 must consist of a material such as copper which totally confines the refrigerant.

Additionally, if the fluid supply section 12 and the fluid return section 13 of the primary heat exchange tube 1 are comprised of metal, such as copper, such metal tube sections (12 and 13) may be encased within protective secondary tubes 8, which may consist of PVC or the like, so as to provide a protective outer layer against acidic or basic soils.

Lastly, cathodic protection should be used to protect exposed subterranean metal when such metals are in reactive soils, meaning soils with acidic or basic levels which will adversely affect the subject exposed metal. For example, exposed copper should be cathodically protected when in soils with pH levels below 5, where the pH scale goes from 1 to 14, with levels below 7 being acidic. Thus, in some applications of the invention, the metal tube must be cathodically protected. When cathodically protecting the exposed subterranean metal tubes via electrical current maintenance, a slight direct current is maintained by placing a metal rod, or rods 23 (FIG. 3), into the ground approximately ten to twenty feet away from the exposed subterranean metal tube, with the positive terminal of the DC power supply 22 connected, via insulated wire 24, to the rod, or rods, and with the negative terminal of the DC power supply 22 connected, via insulated wire 25, to the copper or other exposed subterranean metal tube. Where a sacrificial anode is utilized, the sacrificial anode (20) FIG. 3, made of magnesium or zinc for example, is located in the ground approximately ten feet to twenty feet away from any exposed metal refrigerant fluid transfer tubes, but connected by insulated wire 21 to at least one portion of the exposed metal tube matrix, so as to prevent adverse effects of a galvanic cell. The sacrificial anode should be located in ground with as similar as possible moisture content as the exposed metal refrigerant fluid transfer tube, and the sacrificial anode 20 should be installed at a depth equal or near to the greatest depth of any subterranean exposed metal refrigerant fluid transfer tube. In such event, electrons will flow from the positive side of the power supply, or the sacrificial anode 20, into and through the soil into the exposed metal tubing, with the electrons thereafter flowing back to the sacrificial anode 20 through an electrically insulated connecting wire 21.

For purposes of general illustration, the supply and return sections 12 and 13 of the heat exchange tube 1 are shown as having equal diameters. Those skilled in the art will appreciate that in actual use, the supply and return sections will have different diameters, because one of the supply and return lines will be a smaller diameter liquid line, while the other will be a larger diameter vapor line.

Although the use of an oil return tube 6 is shown and described with specific reference to the embodiment of FIG. 2, it will be apparent that its use is applicable to a wide variety of heat exchange units 7.

Thus, although particular embodiments of an improved heat exchange unit have been described, it is not intended that such description be construed as limiting the scope of this invention except as set forth in the following claims.

What is claimed is:

1. A geothermal heat exchange unit comprising:
   a. a substantially cylindrical core having a rigid wall defining a central axis;
   b. a heat transfer fluid tube having a supply section helically formed around the wall of the core, and a return section connected to a distal end of the supply section;
   c. the return section of the tube disposed along the central axis of a sleeve, the return section separated from the wall of the core by a thermal insulating material; and
   d. the core and heat transfer fluid tube enclosed in a rigid casing, the casing having a thermally conductive outer wall filled with a thermally conductive fill material.

2. The geothermal heat exchange unit of claim 1 wherein the supply section and return section of the heat transfer fluid tube each have an entering portion of the tube which is external to the casing and wherein the supply section further comprises a plurality of parallel fluid conducting tubes having a common inlet and outlet tube.

3. The geothermal heat exchange unit of claim 2 wherein a combined interior area of the fluid conducting tubes is greater than an interior area of the larger of the entering portions of the return section and the supply section.

4. The geothermal heat exchange unit of claim 1 wherein the heat exchange unit is positioned in a sub-surface hole having a diameter larger than the heat exchange unit to define an initial void space between the casing and an inner margin of the hole, with the void space filled with a thermally conductive fill.

5. The geothermal heat exchange unit of 1 wherein the return section of the heat exchange fluid tube is made of a material having a low thermal conductivity.

6. The geothermal heat exchange unit of claim 1 further comprising means to cathodically protect the heat transfer fluid tube from adverse acidic or basic interaction with soil surrounding the tube.

7. The geothermal heat exchange unit of claim 6, the cathodic protection means including one or more sacrificial anodes placed in the soil at a distance from the tube, the distance being in a range of substantially ten to twenty feet, the sacrificial anodes electrically connected to the tube by an electrically insulated wire.

8. The geothermal heat exchange unit of claim 6, the cathodic protection means comprising a source of electrical power connected to the tube and to one or more conductive rods placed in the soil at a distance from the tube, the distance being in a range of substantially ten to twenty feet, whereby a DC current flow is maintained between the rods and the tube, the rods acting as an anode and the tube acting as a cathode.

9. The geothermal heat exchange unit of claim 1 further comprising a compressor oil return tube connected to a lowermost portion of the heat transfer fluid tube, the compressor oil return tube adapted for receiving compressor oil which has separated from heat transfer fluid in the heat transfer tube and for delivering the compressor oil back to a compressor.

* * * * *